Patented Apr. 5, 1949

2,466,404

UNITED STATES PATENT OFFICE 2,466,404

POLYVINYL CARBAMATES

William F. Fowler, Jr., and William O. Kenyon, Rochester, N. Y., assignors to Eastman Kodak Company, Rochester, N. Y., a corporation of New Jersey No Drawing. Application March 8, 1944, Serial No. 525,602

2 Claims. (Cl. 260—77.5)

This invention relates to polyvinyl carbamates and more particularly to N-substituted polyvinyl carbamates and to a process for the preparation thereof.

Polyvinyl carboxylates (i. e. carboxylic esters) in which the carboxylate groups (carboxylic ester groups) are of the fatty acid series, e. g. formate, acetate, propionate, etc. are well known. Moreover, polyvinyl benzoate and polyvinyl chloracetate are known. These polymeric esters are water-insoluble, thermoplastic substances of considerable technological value. Water-soluble forms can be prepared by partially deesterifying these polyvinyl carboxylates, and the partially deesterified forms have found use as surface-active agents. Polyvinyl carbamate has been prepared by interacting polyvinyl alcohol with urea. This substance is water soluble.

We have now found N-substituted polyvinyl carbamates. Most of these substances, if free from a large proportion of hydroxyl groups, are water-insoluble, but soluble in a number of organic solvents and much more resistant to hydrolysis than the polyvinyl carboxylates of the fatty acid series. (An exception to this water insolubility is the polyvinyl N-monomethylcarbamate which appears to be water soluble, even when it does not contain a large proportion of hydroxyl groups). Actually, we have found that polyvinyl carboxylates containing both N-substituted carbamate groups and carboxylate groups of the fatty acid series can be preferentially deesterified, and in this manner we have been able to prepare water-soluble N-substituted polyvinyl carbamates. Inasmuch as our new polyvinyl carbamates are soluble, they are not to be confused with the relatively highly insoluble products formed by the interaction of polyvinyl alcohol and diisocyanates. These relatively highly insoluble products may contain a bis carbamate structure, but are entirely different in properties from our new compounds which contain monocarbamate groups, i. e. the relatively highly insoluble products contain the following linkage:

(1) 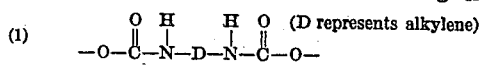  (D represents alkylene)

whereas our new products contain the following group:

(2) 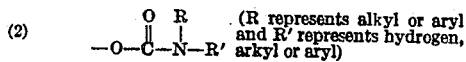  (R represents alkyl or aryl and R' represents hydrogen, arkyl or aryl)

The relatively highly insoluble products are usually considered to involve linear polymeric chains cross-linked to one another by the divalent structure (1) above. Our more soluble products, on the other hand, do not involve such cross-linked chains.

It is, accordingly, an object of our invention to provide soluble polyvinyl carbamates. A further object is to provide a process for the preparation thereof. Other objects will become apparent hereinafter.

In accordance with our invention, we prepare polyvinyl carboxylates (i. e. carboxylic esters) in which at least a portion of the carboxylate groups (carboxylic ester groups) are monocarbamate groups in which at least one hydrogen of the amino group is replaced by an organic radical selected from the group consisting of alkyl and aryl radicals, by reacting a partially deesterified polyvinyl carboxylate with a monoester of isocyanic acid, i. e. an ester of a monohydric alcohol. Typical of the partially deesterified polyvinyl carboxylates which may be employed are partially deesterified polyvinyl acetate, partially deesterified polyvinyl propionate, partially deesterified polyvinyl butyrate, partially deesterified polyvinyl chloracetate and partially deesterified polyvinyl benzoate. Typical of the esters of isocyanic acid which may be employed are methyl isocyanate, n-propyl isocyanate, carbethoxymethyl isocyanate, phenyl isocyanate, o-, m- or p-chlorophenyl isocyanates, p-bromophenyl isocyanate, p-nitrophenyl isocyanate, phenethyl isocyanates, α-naphthyl isocyanate, and β-naphthyl isocyanate.

The same kind of products can also be prepared by condensing a partially deesterified polyvinyl carboxylate such as those set forth above with a carbamyl halide in which at least one hydrogen of the amino group is replaced by an organic radical such as an alkyl or an aryl radical. The condensations are advantageously effected in the presence of an acid-binding agent, such as a tertiary amine.

In either of these aforesaid processes, if the reactions are carried to completion so that all of the alcoholic hydroxyl groups in the partially deesterified polyvinyl carboxylate undergo reaction, the resulting product is a mixed carboxylate of polyvinyl alcohol in which at least a portion of the carboxylate groups are monocarbamate groups. The ratio of carbamate groups to other carboxylate groups will be governed by the degree of deesterification obtaining in the starting partially deesterified polyvinyl carboxylate. If a partially deesterified polyvinyl acetate containing an equal number of vinyl alcohol and vinyl acetate units were carbamylated in accordance with either of the aforesaid processes, the product will contain an equal number of vinyl acetate and vinyl carbamate units. If the starting partially deesterified polyvinyl acetate contained twice as many vinyl alcohol as vinyl acetate units, the resulting mixed carboxylate would contain two carbamate units for each combined acetate unit.

Still a third process can be employed to produce products such as obtained by the foregoing two processes. In the third process, polyvinyl alcohol is caused to react with a mixture of a carboxylic anhydride and a carbamyl halide of the character set forth above in pyridine solution, using sufficient amounts of the acylating mixture to react with all of the hydroxyl groups in the polyvinyl alcohol.

Employing a product obtained by any of the aforesaid three processes, which product contains both carbamate groups and other carboxylate groups, it is possible to prepare polyvinyl carbamates containing both carbamate groups and polyvinyl alcohol hydroxyl groups. Such products are obtained by subjecting any of the aforesaid carbamate and other carboxylate groups to deesterification. The carbamate groups in such mixed ester products are quite resistant to deesterification, we have found, so that they remain attached to the polyvinyl chain during the deesterification while the other carboxylate groups are removed. The partial deesterification of such mixed esters is advantageously effected in the presence of a base such as an alkali metal hydroxide.

Polyvinyl carbamate containing both carbamate and alcoholic hydroxyl groups can also be prepared by treating polyvinyl alcohol with an ester of isocyanic acid or a carbamyl chloride in an amount insufficient to react with all of the hydroxyl groups. Within limits, the relative amounts of unreacted hydroxyl groups in the finished product can be governed by the ratio of the isocyanic ester or the carbamyl chloride to the polyvinyl alcohol employed.

We can also produce, in accordance with our invention, polyvinyl compounds containing free alcoholic hydroxyl groups, carbamate groups and carboxylate groups other than carbamate groups. Such polyvinyl compounds may be produced in one or two ways. First, a partially deesterified polyvinyl carboxylate other than a carbamate can be reacted with an amount of isocyanic ester or carbamyl chloride insufficient to esterify all of the hydroxyl groups present, or a mixed polyvinyl ester containing both carbamate groups and another kind of carboxylate group, can be partially deesterified so that only a part of the other kind of carboxylate groups are removed. Still another method of achieving the same result is to esterify partially by means of a mixture of a carboxylic anhydride (or halide) and a carbamyl halide, a partially deesterified polyvinyl carboxylate, where the stoichiometric sum of the anhydride and carbamyl halide is insufficient to cover all of the hydroxyl groups. Yet another method of achieving the same results is to partially esterify by means of a carboxylic anhydride or halide a polyvinyl carbamate which contains alcoholic hydroxyl groups.

Polyvinyl carbamates containing only a small proportion of hydroxyl groups, or essentially free from hydroxyl groups, can be prepared by condensing polyvinyl alcohols with a carbamyl halide in which at least one hydrogen of the amino group is replaced by an organic radical, such as an alkyl or an aryl radical, using sufficient of the carbamyl halide to react with all the hydroxyl groups in the polyvinyl alcohol, or an excess of the carbamyl halide. These condensations are advantageously effected, in the presence of an acid-binding agent, such as a tertiary amine. Essentially the same products can be prepared by reacting polyvinyl alcohols with a monoester of isocyanic acid, using sufficient of the isocyanate to react with all the polyvinyl alcohol hydroxyl groups, or an excess of the monoisocyanate.

The following examples will serve to illustrate our new polyvinyl compounds and the manner of obtaining the same.

Example I

A sample of partially hydrolyzed polyvinyl acetate containing 30 per cent by weight of residual acetyl groups was dispersed in acetone. Because a material of this composition is on the border line of acetone solubility, a very viscous solution resulted. An excess of phenyl isocyanate was added and the solution was allowed to stand at 20° to 25° C. for 48 hours. The resulting reaction mixture was much lower in viscosity than the original, presumably because of the improved solubility in acetone of the polyvinyl acetate-N-phenyl carbamate produced. Some colorless crystals precipitated from the solution. These were probably diphenyl urea formed by reaction of the phenyl isocyanate with traces of water present in the acetone. These crystals were removed by filtration and the solution was precipitated in water. The precipitate after washing with pyridine and water was dispersed in methanol forming a slightly turbid solution. The solution was filtered and a small amount of a solution of sodium hydroxide in methanol was added as a deacetylation catalyst. On standing at room temperature, the solution set to a gel which did not synerize overnight. The resulting product is distinguished from polyvinyl alcohol in not being water soluble due to the residual N-phenyl carbamate groups. In this method of preparation partially carbamylated products are obtained and the compositions can be varied by using partially deacetylated polyvinyl acetates of various acetyl contents. The deacetylation of the mixed esters removes preferentially the acetyl group.

Example II—N-monophenyl polyvinyl carbamate 25.8 grams (0.57 mole) of high viscosity polyvinyl alcohol powder were suspended in a mixture containing 150 cc. of anhydrous pyridine and 70 grams (0.57 mole) of phenyl isocyanate in a 1-liter, 3-necked flask equipped with a thermometer, mechanical stirring device, and spiral condenser provided with a calcium chloride drying tube. The mixture was stirred at room temperature but the temperature rose in a very few minutes to 45° C. due to the exothermic reaction which ensued. The temperature was then raised to 90° C. on the steam bath and the mixture stirred at this temperature for ½ hour. A viscous solution resulted to which was added 150 cc. more of anhydrous pyridine. The solution was stirred thoroughly, filtered through a cloth filter bag, and permitted to cool to room temperature. The solution was then precipitated in cold tap water and the precipitate broken up into small pieces which were brittle. The product was washed in hot tap water (60° C.) for 15 hours after which no odor of pyridine or the isocyanate was discernible. The material was dried for 24 hours at 50° C. The yield was 73.1 per cent of the theoretical or 70 grams. The product contained 8.93 per cent of nitrogen, the calculated value for a completely esterified product being 8.59 per cent. The N-monophenyl polyvinyl carbamate is soluble in pyridine, 1,4-dioxane, and ethylene chloride from which clear films may be cast. The slightly high analysis for nitrogen is probably due to the presence of retained diphenyl urea arising by reaction of the isocyanate with water.

*Example III.—N-monophenyl polyvinyl carbamate*

31.1 grams (0.2 mole) of N-monophenyl carbamyl chloride were dissolved in 50 cc. of anhydrous pyridine. 4.4 grams (0.1 mole) of high viscosity polyvinyl alcohol were then added and the mixture stirred and heated on the steam bath. Five minutes heating at 85° C. produced a clear, pale yellow solution. This was immediately cooled to room temperature, filtered, precipitated and washed with running hot water as in Example II. After drying for 24 hours at 50° C., the product was ground to a fine powder and then extracted continuously with ether for 24 hours in a Soxhlet apparatus. The sample was then dried for 2 hours at 50° C. This material was found to contain 8.44 per cent of nitrogen (theory 8.59 per cent) and showed the same properties as the product obtained in the preceding example.

*Example IV.—N-monoethyl polyvinyl carbamate*

The following mixture was heated on the steam bath for 24 hours with mechanical agitation in an apparatus similar to that described in Example II:

44 grams (1 mole) of high viscosity polyvinyl alcohol
145 grams (2 moles) of freshly prepared ethyl isocyanate
500 cc. of anhydrous pyridine The reaction flask was immersed in a steam bath for the heating. In one hour a clear, brilliant yellow solution was obtained. Heating was continued, however, to insure complete reaction as possible. A dark, red solution resulted after the 24 hours of heating. The solution was filtered, cooled, precipitated in the same manner as the material in Example II, and was then washed for 48 hours in running cold water. A slight odor of ethyl isocyanate (lachrymator) was evident so the excess water was drained off and the polymer was dissolved in ethanol on the mechanical shaker. The resin was precipitated in water, washed, and dried for 24 hours at 50° C. The product contained 9.89 per cent of nitrogen, 12.15 per cent being the calculated value for a completely esterified product. The polymer is readily soluble in ethanol and will tolerate 45 per cent of water due to the solubilizing action of the unreacted hydroxyl groups in the resin and can be coated either from alcohol or alcohol-water mixtures to give clear films.

*Example V.—N,N-diethyl polyvinyl carbamate*

The following mixture was heated on the steam bath for 94 hours with mechanical agitation in an apparatus similar to that described in Example II:

44 grams (1 mole) of high viscosity polyvinyl alcohol
135.5 grams (1 mole) of N,N-diethyl carbamyl chloride
1000 cc. of anhydrous pyridine After ½ hour of heating, 25 grams more of the acid chloride were added. At the end of the heating period the solution was dark brown in color. After cooling, filtering, and precipitating, the resin was broken up into small pieces and washed in running cold tap water for 24 hours. Excess water was drained off and the polymer was dissolved in acetone on the mechanical shaker. The product was again precipitated in water, washed, drained, redissolved in acetone and reprecipitated in water. After washing for 24 hours more in cold running water, the resin was dried at 50° C. This product contained 7.98 per cent of nitrogen, the theoretical value for a completely esterified product is 9.79 per cent of nitrogen. The resin is soluble in acetone and in acetone-water mixtures.

*Example VI.—N-monoethyl polyvinyl acetate-carbamate*

The following mixture was refluxed and stirred on a steam bath:

852 g. of partially hydrolyzed polyvinyl acetate containing an acetate group content equivalent to 65 per cent by weight of polyvinyl acetate
10 l. of acetone
260 cc. of dry pyridine
1 kg. of ethyl isocyanate After 3 hours heating and stirring, the polyvinyl compound had become highly swollen. At the end of 27 hours, the material was still not completely in solution. 500 cc. of dry pyridine were added to the mixture and the heating and stirring were resumed for 72 additional hours. The polyvinyl acetate-carbamate was then precipitated by pouring the reaction mixture into cold water. The precipitated substance was washed in running hot water (in a hood) for 20 hours, and finally steamed for 8 hours. The resulting mass was then chopped into small pieces and dried in the oven at 55° C. for 20 hours. The yield of very pale brown product was 982 g. (74.6 per cent) and contained 4.47 per cent by weight of nitrogen. This product contained polyvinyl alcohol hydroxyl groups.

*Example VII.—N-monoethyl polyvinyl acetate-carbamate*

150 g. of wet partially hydrolyzed polyvinyl acetate containing an acetate group content equivalent to 75 per cent by weight of polyvinyl acetate, were dissolved in 600 cc. of ethylmethyl ketone. This solution, while stirring, was dehydrated by azeotropic distillation of a steam bath, adding dry ethylmethyl ketone from time to time. When the boiling point rose from 73.4° C. (a constant boiling point for the azeotrope containing 11.3 per cent of water) to 79.6° C. (boiling point for ethylmethyl ketone), distillation was discontinued. A hazy semi-gelatinous mass resulted weighing 388 g. and containing 22 per cent by weight of solids. This mass was mixed with 70 g. of dry pyridine, 70 g. of ethyl isocyanate and 100 g. of acetone. The resulting mixture was then heated with stirring under total reflux on a steam bath for 48 hours. During this period, the contents of the flask became a smooth, viscous solution and most of the haze disappeared. The reaction mixture was then permitted to cool and, after cooling, was poured into cold water to precipitate the polyvinyl acetate-carbamate. The precipitated mass was steamed in water for 5 hours, dissolved in 500 cc. of methanol and reprecipitated by pouring the methanol solution into warm (60° C.) water. The precipitated mass was again steamed for 4 hours, cut into fairly small pieces and dried in an oven at 55° C. for 24 hours. The yield of hard, pale tan, transparent product was 124 g. The product contained 3.09 per cent by weight of nitrogen. This product contained polyvinyl alcohol hydroxyl groups.

*Example VIII.—N-monoethyl polyvinyl-polyisopropenyl carbamate*

100 g. of a copolymer of vinyl acetate and isopropenyl acetate, prepared by heating a mixture of 300 g. of vinyl acetate, 100 g. of isopropenyl acetate and 0.4 g. of benzoyl peroxide in a sealed tube at 50° C. (see the copending application of Cornelius C. Unruh and William O. Kenyon, Serial No. 515,432, filed December 23, 1943, now abandoned) were dissolved in 900 cc. of methanol. 5 g. of sodium hydroxide dissolved in 100 cc. of methanol were then added to the solution and gelation occurred in about one hour. After two hours standing at 20° to 25° C., the gel commenced to synerize. The gel was permitted to synerize for 96 hours. The gel was then broken up into small pieces and the supernatant liquid was decanted. 250 cc. of water were added to the gel and the gel was dissolved in the water by steam heating the mixture with stirring until the methanol had distilled off. The deacetylated polyvinyl-polyisopropenyl compound was then precipitated by pouring the aqueous solution into methanol. The precipitated polyvinyl-polyisopropenyl compound was washed with several changes of methanol and dried for 24 hours at 55° C. 20 g. of this polyvinyl-polyisopropenyl compound, 60 g. of ethanol isocyanate and 300 g. of anhydrous pyridine were heated on a steam bath under total reflux with stirring. A solution occurred within a few hours, but heating and stirring were continued for a total of 20 hours. The resulting clear solution was poured into diethyl ether to precipitate the polyvinyl-polyisopropenyl carbamate. The precipitated substance was dissolved in methanol and twice reprecipitated in ether. The final precipitate was cut into small pieces and dried in vacuo over anhydrous calcium chloride. The yield was 39 g. and the product contained 10.11 per cent by weight of nitrogen.

*Example IX.—N,N-diphenyl polyvinyl acetate-carbamate*

60 g. of N,N-diphenyl carbamyl chloride were mixed with 400 cc. of anhydrous pyridine. A copious precipitate of a pyridine complex appeared. 33 g. of partially hydrolyzed polyvinyl acetate (containing an acetate group content equivalent to 65 per cent by weight of polyvinyl acetate) were suspended in the mixture. The mixture was then heated on a steam bath when it became clear and turned a pale brown color. After three hours heating, 100 cc. of dry pyridine were added to the mixture in order to reduce the viscosity and facilitate stirring. The mixture was then heated on a steam bath with stirring under reflux for 8 hours. The mixture was then permitting to cool for a period of about 12 hours. The mixture was poured into water in order to precipitate the polyvinyl carbamate and then after drying by centrifuging, the polyvinyl carbamate was dissolved in 300 cc. of methanol. This procedure was repeated three additional times to reduce the color of the product. However, the final product was still a pale brown color. The product was finally steamed in water for several hours, cut into small pieces and dried for 24 hours at 55° C. The yield of dry polymer was 27 g. It contained 2.19 per cent by weight of nitrogen. This product contained polyvinyl alcohol hydroxyl groups.

*Example X.—N-monomethyl polyvinyl carbamate*

The following mixture was heated on the steam bath with mechanical agitation under anhydrous conditions for 20 hours.

13 g. of methyl isocyanate
5 g. of high viscosity polyvinyl alcohol
75 cc. of anhydrous pyridine At the end of the 20 hour heating and stirring period, the originally heterogeneous mixture had been transformed into a clear, pale brown solution. The pyridine dope was diluted with 75 cc. of methanol to reduce the viscosity and this solution precipitated with agitation into acetone. The precipitated material was allowed to stand in acetone which was daily changed for three days. Then the polymer was dried 24 hours in vacuum over anhydrous calcium chloride. The yield of dry polymer was 5 grams. This material was found to be soluble in either cold or hot water. Analysis of a sample indicated that the material contained 10.79 per cent of nitrogen, the calculated value for complete carbamylation being 13.87 per cent of nitrogen.

Instead of employing a partially or completely deesterified polyvinyl acetate, other partially or completely deesterified polyvinyl esters can be employed. Moreover, products obtained by partially or completely deesterifying a copolymer of one or more vinyl esters can also be employed. Furthermore, products obtained by partially or completely deesterifying copolymers of vinyl esters with other unsaturated compounds, e. g. vinyl chloride, allyl acetate, methylacrylate, methyl α-methacrylate, isopropenyl acetate, isopropenyl methyl ketone, or acrylonitrile. The term polyvinyl carboxylate (or carboxylic ester) as used herein is intended to embrace all such homopolymers or copolymers containing vinyl carboxylate (i. e. vinyl carboxylic ester) units.

Our new carbamate compounds which are strongly susceptible to water can be employed as gelatin substitutes in the manufacture of photographic silver halide emulsions. The ultimate product of Example I and the product of Example IV are compounds which can be used as gelatin substitutes. All of our new products can be cast from solutions onto film-forming surfaces to give films which can be stripped from the surface. Such films are more or less water resistant depending upon the composition of the products. The product of Example II is an instance of a more water resistant product. Many of our new products can be spun from solutions into the form of threads. For example, the products of Examples VI to IX, as well as the products of Examples II, III and V, can be so spun. The products are also useful as interlayers between photographic silver halide emulsion layers, such as of the gelatin type. Our new products containing only carbamate groups and hydroxyl groups attached to the polyvinyl chain are useful as gelatin substitutes in the manufacture of photographic silver halide emulsions.

What we claim as our invention and desire to be secured by Letters Patent of the United States is:

1. A polyvinyl ester of N-monoethylcarbamic acid containing as the only other groups bound to the polyvinyl chain those selected from the group consisting of hydroxyl and carboxylate groups containing from 2 to 4 carbon atoms.

2. A polyvinyl ester of N-monoethylcarbamic acid containing as the only other groups bound to the polyvinyl chain those selected from the group consisting of hydroxyl and acetate groups.

WILLIAM F. FOWLER, Jr.
WILLIAM O. KENYON.

REFERENCES CITED

The following references are of record in the file of this patent:

UNITED STATES PATENTS

| Number | Name | Date |
|---|---|---|
| 1,357,450 | Goissedet | Nov. 2, 1920 |
| 1,991,107 | Malm et al. | Feb. 12, 1935 |
| 2,179,051 | Morrison et al. | Nov. 7, 1939 |
| 2,249,535 | Macallum | July 15, 1941 |
| 2,284,896 | Hanford et al. | June 2, 1942 |
| 2,304,252 | Hager et al. | Dec. 8, 1942 |
| 2,373,135 | Maxwell | Apr. 10, 1945 |
| 2,384,123 | Muskat et al. | Sept. 4, 1945 |

FOREIGN PATENTS

| Number | Country | Date |
|---|---|---|
| 519,049 | Germany | Feb. 28, 1931 |

OTHER REFERENCES

Hermann et al., Berichte, vol. 60, pp. 1658–1663 (1927).

Sidgwick, "The Organic Chemistry of Nitrogen," pages 272–273, published 1937 by Oxford University Press, London. (Copy in Div. 6.)

Hearon et al. (1) art. in J. Am. Chem. Soc. 65 829–833, May 1943.

Hearon et al. (2) art. in J. Am. Chem. Soc. 65 833–836, May 1943.

Shriner-Fuson, Indentification of Org. Compounds, Wiley, N. Y., pages 133 and 186–7 (1940).